US009989632B2

(12) United States Patent
Yanobe

(10) Patent No.: US 9,989,632 B2
(45) Date of Patent: Jun. 5, 2018

(54) MEASURING SYSTEM, AND PORTABLE RADIO TRANSCEIVER AND MEASUREMENT POLE USED IN MEASURING SYSTEM

(71) Applicant: Kabushiki Kaisha TOPCON, Tokyo (JP)

(72) Inventor: Satoshi Yanobe, Tokyo (JP)

(73) Assignee: KABUSHIKI KAISHA TOPCON, Tokyo (JP)

( * ) Notice: Subject to any disclaimer, the term of this patent is extended or adjusted under 35 U.S.C. 154(b) by 356 days.

(21) Appl. No.: 14/876,364

(22) Filed: Oct. 6, 2015

(65) Prior Publication Data

US 2016/0109560 A1    Apr. 21, 2016

(30) Foreign Application Priority Data

Oct. 20, 2014   (JP) .................................. 2014-213746

(51) Int. Cl.

| | |
|---|---|
| *G01S 7/51* | (2006.01) |
| *G01S 17/42* | (2006.01) |
| *G01S 7/481* | (2006.01) |
| *G01C 15/00* | (2006.01) |
| *G01S 17/87* | (2006.01) |
| *G01S 7/00* | (2006.01) |

(52) U.S. Cl.
CPC .............. *G01S 7/51* (2013.01); *G01C 15/002* (2013.01); *G01S 7/003* (2013.01); *G01S 7/4812* (2013.01); *G01S 7/4817* (2013.01); *G01S 17/42* (2013.01); *G01S 17/87* (2013.01)

(58) Field of Classification Search
CPC .............................. G01C 15/002; G06F 17/50
See application file for complete search history.

(56) References Cited

U.S. PATENT DOCUMENTS

| | | | |
|---|---|---|---|
| 2001/0019101 A1* | 9/2001 | Ohtomo ............... | G01C 15/002 250/206.1 |
| 2003/0065446 A1* | 4/2003 | Ootomo ................ | G01C 15/00 702/5 |

FOREIGN PATENT DOCUMENTS

JP        2012-202821        10/2012

* cited by examiner

*Primary Examiner* — Luke D Ratcliffe
(74) *Attorney, Agent, or Firm* — Roberts Mlotkowski Safran Cole & Calderon P.C.

(57) ABSTRACT

To provide a measuring system for guiding a worker to a pile driving point by utilizing a measuring device for performing a distance measurement and an angle measurement by automatic guiding and a controller. The measuring system includes a measurement pole 50 equipped with a prism 52, a measurement device 2 having an automatic guiding function, a memory section 30L, a display section 30G displaying a guiding map, an imaging optical system 30E, and a controller 30C having a transceiver 30D, calculates a difference between present position information and a pile driving point position information, calculates a moving direction of the prism 52 from the current position information and previous position information by the imaging optical system 30E, and when these moving directions are different, calculates a gradient component θ of the controller 30C, and displays a guiding map by amended spaced-apart components Δx", Δy" amended by the gradient components.

6 Claims, 13 Drawing Sheets

MEASURING SYSTEM, AND PORTABLE RADIO TRANSCEIVER AND MEASUREMENT POLE USED IN MEASURING SYSTEM

CROSS-REFERENCE TO RELATED APPLICATION

This application claims priority under 35 USC 119 from Japanese Patent Application No. 2014-213746, filed Oct. 20, 2014, the disclosure of which is incorporated by reference herein.

TECHNICAL FIELD

The present invention relates to a measuring system for guiding a worker to a pile driving point, and a portable radio transceiver and a measurement pole used in the measuring system.

BACKGROUND ART

In a certain type of a recent measuring system, a pile driving point is graphically displayed on a display section of a controller by utilizing a measuring device for performing the distance measurement and the angle measurement by means of automatic guiding and the controller having a camera function and a display section, and the pile driving point is displayed on a camera image for guiding the worker having a measurement pole to the pile driving point (Patent Publication 1).

More in detail, in this conventional measuring system, the worker for the pole driving having the measurement pole and the controller moves while directing the prism of the measurement pole and the front end of the controller toward a measuring device. Then, a relative distance from the measuring device having the automatic guiding function to the prism equipped in the measurement pole is measured, and the position information based on the distance measurement is transmitted to the controller. The controller calculates spaced-apart components $\Delta x'$, $\Delta y'$ between the current position and the pile driving point based on the position information of the pile driving point obtained in advance and the position information of the above distance measurement obtained in the measuring device (described in detail later). When an earth magnetic sensor is provided near the controller, the spaced-apart components $\Delta x'$, $\Delta y'$ are calculated, on the basis of the north, by use of an orientation signal of the earth magnetic sensor and the above position information (described in detail later).

PRIOR TECHNICAL PUBLICATIONS

Patent Publications

Patent Publication 1: JP-A-2012-202821

SUMMARY OF INVENTION

Problems to be Solved by Invention

Since the spaced-apart components $\Delta x'$, $\Delta y'$ are calculated based on a premise that the front end of the controller is positioned in a directly facing direction F with the measuring device in the above measuring system, the direction may be mistakenly guided if the direction of the controller is not matched. When the earth magnetic sensor is provided near the controller, the degree of accuracy of the orientation sensor of this kind may be adversely affected on a job site having a lot of steal beams and a strong magnetic force.

An object of the present invention is to provide, for overcoming the above problem, a measuring system for more accurately guiding a worker to a pile driving point by utilizing a measuring device for performing the distance measurement and the angle measurement by means of automatic guiding and a controller having a camera function and a display section, and a portable radio transceiver and a measurement pole used in the above measuring system.

Means of Solving Problems

The present invention for achieving the object has the configuration of a measuring system including a measurement pole equipped with a prism; a measuring device including a lens barrel having a scanning optical system for searching the prism and a distance-measuring optical system for measuring a distance to the prism, a driving section which rotates the lens barrel around a vertical axis in a horizontal direction and around a horizontal axis, an angle-measuring section for measuring a direction of the lens barrel, a memory section of the measuring device which stores, as a measurement data, the distance to the prism obtained by the distance-measuring optical system and the direction of the lens barrel obtained by the angle-measuring section, and a controlling section which controls the driving section, the scanning optical system and the distance-measuring optical system, and controls the driving section such that the lens barrel faces to a next pile driving point to be measured, and a transceiver of a measuring device side transmitting the measurement data stored in the memory section; and a portable radio transceiver which includes a memory section of a portable side storing a design data of a pile driving point, a display section displaying a guiding map, an imaging optical system, and a radio transceiver of a portable side conducting transmission with the transceiver of the measuring device side, wherein the measuring device transmits the measurement data stored in the memory section of the portable side to the portable radio transceiver, the portable radio transceiver is fixed on an axis of the measurement pole, calculates a difference between a current position information of the prism based on the received measurement data and a position information of a next pile driving point based on the design data of the memory section of the portable side, calculates a moving direction of the prism based on the current position information of the prism and a position information obtained at a previous receiving, calculates a moving direction of the portable radio transceiver by calculating an optical flow from a current image of the current position information and from a previous image of the previous position information based on the imaging optical system, calculates a gradient component from a directly facing direction of the portable radio transceiver with respect to the measuring device when the moving direction of the prism is different from the moving direction of the portable radio transceiver, amends the difference by means of the gradient component, and displays, on the display section, a space from the current position of the prism to the next pile driving point by means of the amended gradient component.

A portable radio transceiver in accordance with the present invention includes a configuration that the portable radio transceiver comprises the memory section of the portable side storing the design data, the display section displaying the guiding map, the imaging optical system, the radio transceiver of the portable side conducting the transmission with the transceiver of the measuring device side, a difference calculating unit calculating the difference between the current position information based on the measurement data and the position information of the pile driving point based on the design data of the memory section of the portable side; a prism moving direction calculating unit calculating the moving direction of the prism based on the current position information and the previous position information obtained at the previous receiving; a portable device moving direction calculating unit calculating the moving direction of the prism based on the current position information and the previous position information obtained at the previous receiving; a portable device moving direction calculating unit calculating the optical flow from the current image of the current position information and from the previous image of the previous position information based on the imaging optical system; a gradient calculating unit calculating the gradient component from the directly facing direction of the portable radio transceiver with respect to the measuring device when the moving direction of the prism is different from the moving direction of the portable radio transceiver; an amending unit amending the difference of the difference calculating unit based on the gradient component obtained by the gradient calculating unit; and a display processing unit displaying, on the display section, the space from the current position of the prism to the next pile driving point based on the amended gradient component.

A measurement pole in accordance with the present invention includes the measurement pole including the pole having a ferule at its bottom end, a retroreflection prism equipped in the pole, and a fixing section detachably fixing the portable radio transceiver on a top end of the pole such that the front end of the portable radio transceiver is nearly coincident with an incident direction of the prism.

Effect of Invention

In accordance with the measuring system of the present invention, the difference between the current position information of the prism equipped in the measurement pole and the position information of the next pile driving point is calculated by using the measuring device obtaining the measurement data by means of the automatic guiding, the measurement pole, and the portable radio transceiver having the imaging function. Further, the gradient component of the portable radio transceiver is calculated by calculating the moving direction of the portable radio transceiver by means of utilizing the image of the imaging optical system equipped in the portable radio transceiver and comparing with the moving direction of the prism. The amended spaced-apart components $\Delta x''$, $\Delta y''$ amended by the addition of the gradient component are calculated and displayed.

Thereby, in the measuring system of the present invention, the accurate guiding can be performed because the value of the next pile driving point is displayed in consideration of the gradient component even when the front end of the portable radio transceiver is not positioned in the directly facing direction with the measuring device.

Since the spaced-apart components $\Delta x''$, $\Delta y''$ are calculated by using no output value of an orientation sensor, the orientation sensor is not required in the neighborhood of the portable radio transceiver or the portable transceiver, and further, the accurate guiding can be performed while a deviation due to a magnetic filed is excluded.

In accordance with the portable radio transceiver used in the measurement system of the present invention, the accurate guiding can be performed because the value of the next pile driving point is displayed in consideration of the gradient component even when the front end of the portable radio transceiver is not positioned in the directly facing direction with the measuring device.

In accordance with the measurement pole used in the measurement system of the present invention, since the fixing section for fixing the portable radio transceiver is mounted on the top end of the pole such that the front end of the portable radio transceiver is coincident with the incident direction of the prism, the optical flow processing can be accurately performed in the portable device moving direction calculating unit equipped in the portable radio transceiver.

The fixing section is detachable so that the original direction of the portable radio transceiver can be restored after the portable radio transceiver is removed from the pole depending on the working conditions.

EMBODIMENTS FOR IMPLEMENTING INVENTION

Preferred embodiments of the present invention will be described referring to the annexed drawings.

(Measuring Device)

Figure 1:
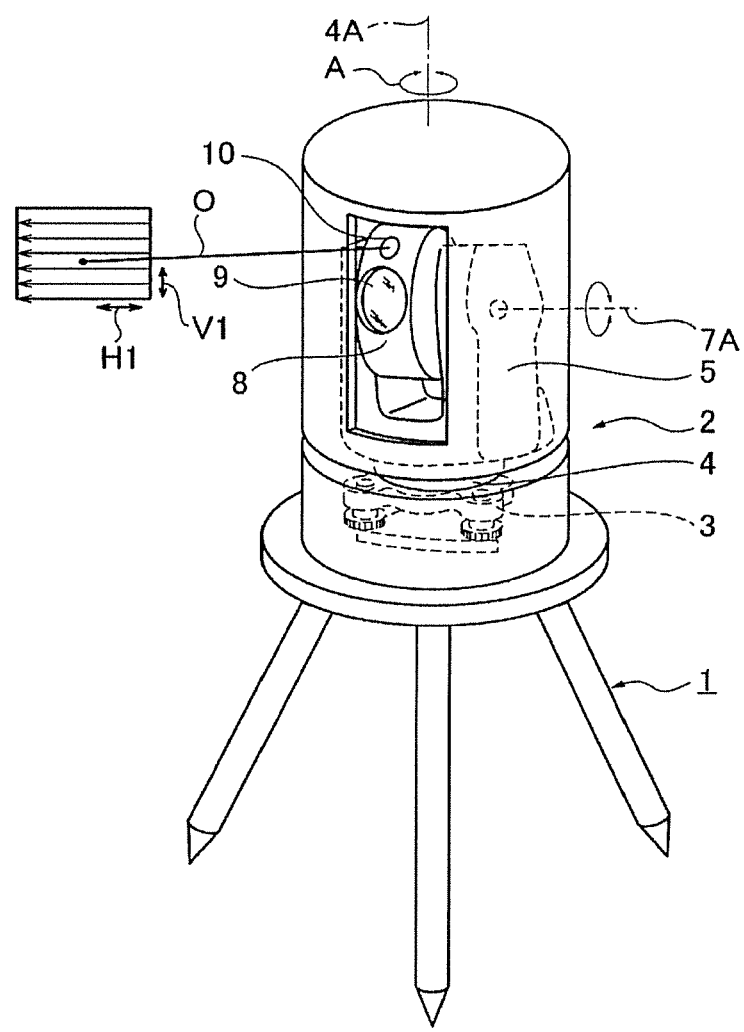
FIG. 1 A perspective view showing the brief configuration of a measuring device in accordance with the embodiment.

In FIG. 1, a numeral 1 shows a tripod, and a numeral 2 shows a measuring device. The measuring device 2 is disposed on the tripod 1 via a base 3 having an adjusting screw. The measuring device 2 includes a mounting stand 4, and is positioned on a known standard point.

The mounting stand 4 rotates in the horizontal direction shown by an arrow A with respect to the base 3 centering around a vertically rotating axis 4A. A base stand 5 having a horizontally rotating axis 7A is mounted on the mounting stand 4, and includes a lens barrel 8. The lens barrel 8 is horizontally rotated by the rotation of the mounting stand 4 and is vertically rotated by the rotation of the horizontally rotating axis 7A. A distance-measuring optical system 9 and a scanning optical system 10 are mounted in the lens barrel 8.

Encoders (angle-measuring sections, not shown) are mounted in the lens barrel 8 for precisely measuring a rotation angle when the mounting stand 4 rotates centering around the vertically rotating axis 4A, and another rotation angle when the lens barrel 8 rotates centering around the horizontally rotating axis 7A.

Figure 3:
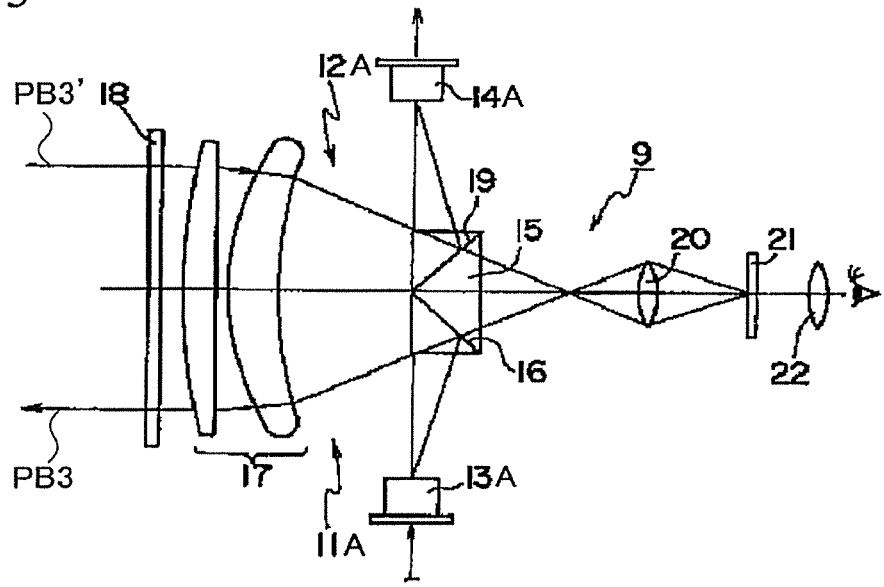
FIG. 3 An optical view of an example of a distance-measuring optical system shown in FIG. 2.

As shown in FIG. 3, the distance-measuring optical system 9 includes a light-projecting section 11A and a light-receiving section 12A. The light-projecting section 11A includes a light source 13A, and the light-receiving section 12A includes a light-receiving element 14A. The light source 13A emits an infrared laser beam which is reflected by means of a dichroic mirror 16 of a beam splitter 15 toward an objective lens 17, and is output from the lens barrel 8 through a cover glass 18 as a parallel beam PB3.

The parallel beam PB3 is reflected by a prism 52 (described later in detail) acting as a target, returns to the objective lens 17 through the cover glass 18, is reflected by a dichroic mirror 19 of the beam splitter 15, and converges on the light-receiving element 14A. The distance-measuring optical system 9 includes an imaging lens 20 and a reticle plate 21. Visible light reaches the imaging lens 20 after passing through the objective lens 17 and the dichroic mirrors 16, 19 and converges on the reticle plate 21. A worker can confirm by sight through an ocular lens 22 the neighborhood around the pile driving position including a corner cube 30A.

Figure 4:
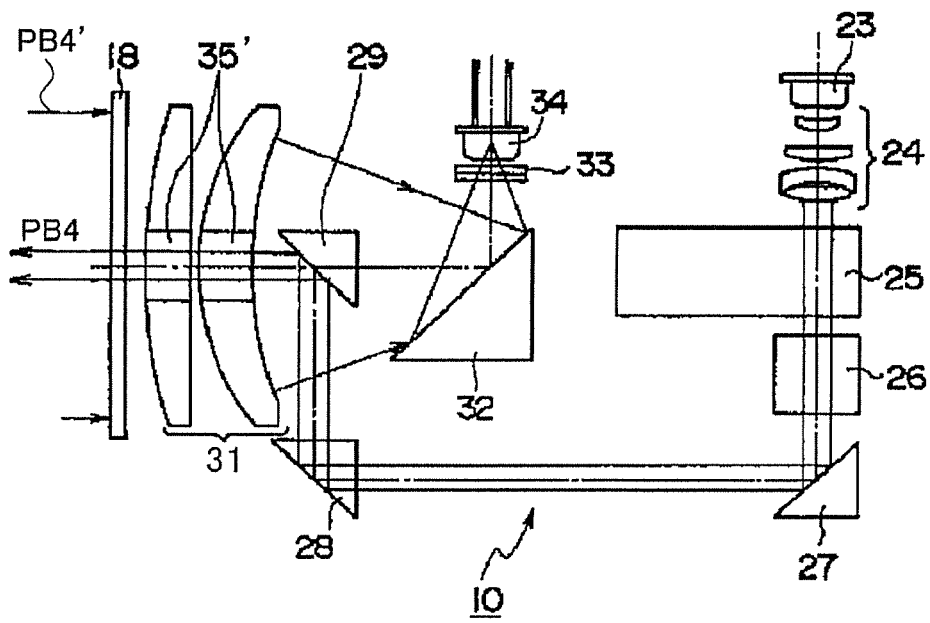
FIG. 4 An optical view of an example of a scanning optical system shown in FIG. 2.

As shown in FIG. 4, the scanning optical system 10 includes a laser diode 23, a collimator lens 24, a horizontal direction light-deflection element 25, a vertical direction light-deflection element 26, reflection prisms 27, 28, 29, an objective lens 30, the cover glass 18, a reflection prism 32, a filter 33 for removing noise light, and a light-receiving element 34. The laser diode 23, the collimator lens 24, the horizontal direction light-deflection element 25, the vertical direction light-deflection element 26, and the reflection prisms 27, 28, 29 constitute the most of the light-projecting section 11A. The objective lens 30, the filter 33, and the light-receiving element 34 constitute the most of the light-receiving section 12A. The light-deflection elements 25, 26 are, for example, acousto-optic elements. In these light-deflection elements 25, 26, an ultrasonic wave is propagated into the acousto-optic medium by means of an electric signal to generate a periodic change of refraction index, thereby deflecting incident light.

The laser diode 23 outputs infrared laser light PB4 having a wavelength different from that of distance-measuring light of the distance-measuring optical system 9. The infrared laser light PB4 is made to a parallel beam by the collimator lens 24, and is led to the horizontal direction light-deflection element 25. The horizontal direction light-deflection element 25 deflects the infrared laser light PB4 to the horizontal direction while the vertical direction light-deflection element 26 deflects the infrared laser light PB4 to the vertical direction V1. The infrared laser light PB4 is led to the reflection prism 27 and reflected thereby and led to an objective lens 31 through the reflection prisms 28, 29.

Penetration apertures 35' are formed through the objective lens 31 coaxially with an optical axis of the objective lens 31. The infrared laser light PB4 reflected by the reflection prism 29 is externally output through the penetration apertures 35' from the measuring device 2, and the scanning for the search of the prism 52 is conducted by this infrared laser light PB4. When the prism 52 is present within the searching area, the infrared laser light PB4 is reflected by the prism 52 and returns to the objective lens 31. The reflection light PB4' of the infrared laser light PB4 converges on the objective lens 31, reflected by the reflection prism 32 and the image of the infrared laser light PB4 is formed on the light-receiving element 34 through the filter 33 for removing noise light. The filter 33 has a function of permeating light having the same wavelength as that of the infrared laser beam. In this manner, the scanning for the search shown in FIG. 1 is implemented. In FIG. 1, a symbol O shows an optical axis of the scanning optical system 10, V1 shows a vertical direction and H1 shows a horizontal direction. For example the scanning for the search is implemented in a region where a horizontal direction angle width is 4.5 degree, and a vertical direction angle width is 3 degree.

Figure 2:
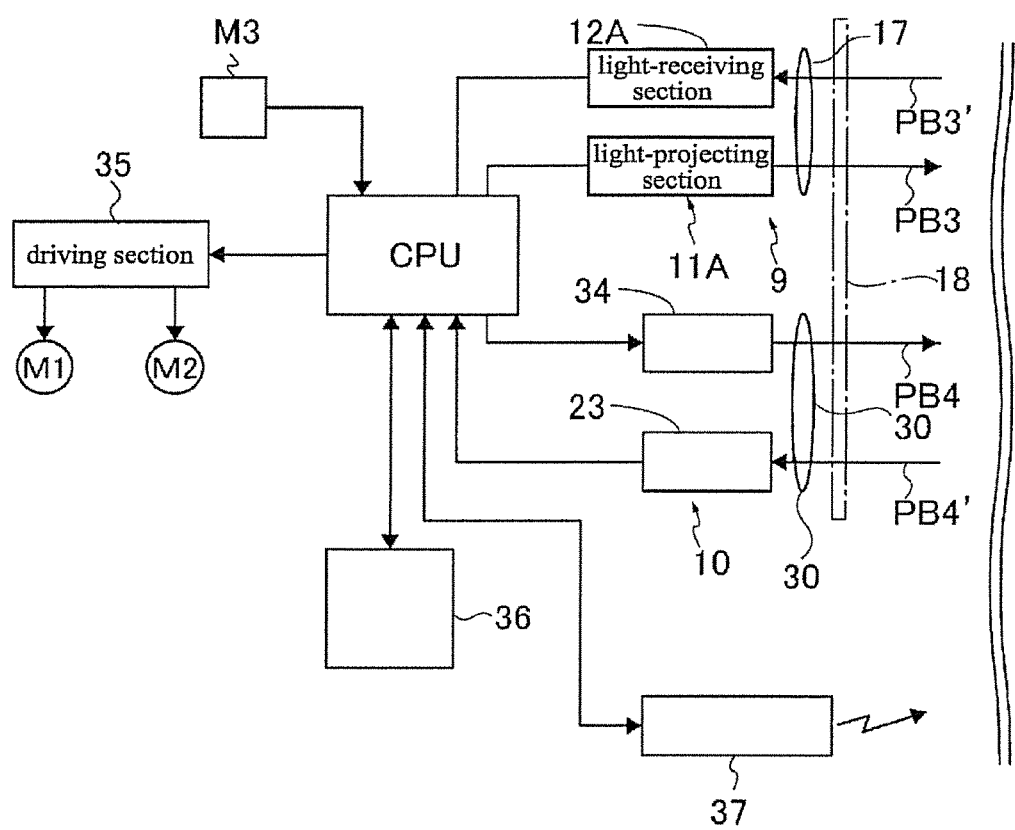
FIG. 2 A block diagram of the internal configuration of the measuring device in accordance with the embodiment.

The measuring device 2 includes a driving section 35 shown in FIG. 2. A horizontal direction driving motor M1 and a vertical direction driving motor M2 are connected to the driving section 35. The motor M1 has a function of rotating the lens barrel 8 in the horizontal direction while the motor M2 has a function of rotating the lens barrel 8 in the vertical direction. The driving section 35 is controlled by a controlling section CPU.

When a radio transceiver 37 described later receives a rotation permitting signal, the controlling section CPU outputs the rotation permitting signal for the horizontal direction driving motor M1 toward the driving section 35. A direction sensor M3 is connected to the controlling section CPU. The controlling section CPU calculates a rotation angle from the current horizontal direction angle at which the lens barrel 8 of the measuring device 2 faces to the next pile driving point by using the direction signal of the direction sensor M3 and the rotation permitting signal. When the lens barrel 8 stops the rotation at the next pile driving point, the controlling section CPU outputs a rotation permitting signal for the vertical direction driving motor M2 toward the driving section 35. The driving section 35 forwardly and reversely rotates the vertical direction driving motor M2 in an alternate fashion, and the infrared laser light PB4 performs the scanning in the vertical direction in a reciprocate manner at the next pile driving point.

When a worker is positioned on the neighborhood of the next pile driving point, the controlling section CPU locks the prism 52 and implements the measurement of the distance to the prism and the measurement of the angle. Then, the controlling section CPU obtains distance data from the prism 52 to the measuring device 2 and angle measurement data by means of calculation. As shown in FIG. 2, the measuring device 2 includes a memory section 36 (memory section of measuring device) and a radio transceiver 37 (radio transceiver of measuring device). The memory section 36 and the radio transceiver 37 are connected to the controlling section CPU. The distance data and the angle measurement data are temporarily stored in the memory section 36. The radio transceiver 37 transmits the measurement data to a portable radio transceiver 30C.

While the configuration of the measuring device 2 for conducting the distance measurement and the angle measurement by means of the automatic guiding has been described, the above is an example and other changes may be performed on the measuring device 2 of the present embodiment. The measuring device 2 may include a laser device for roughly guiding a worker to a direction toward the next pile driving point.

(Portable Radio Transceiver)

Figure 5:
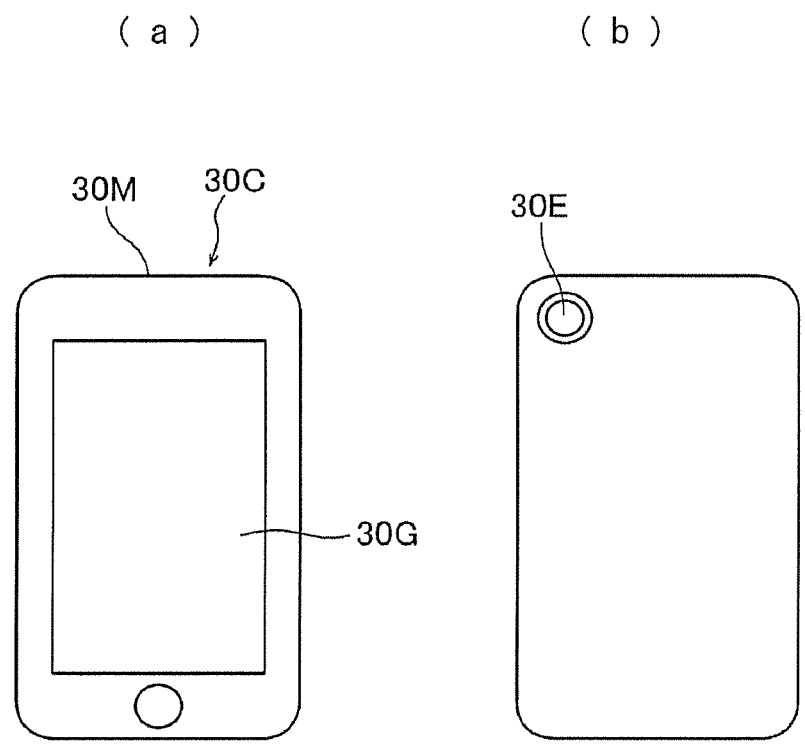
FIG. 5 A plan view of an example of a portable radio transceiver in accordance with the embodiment.
Figure 6:
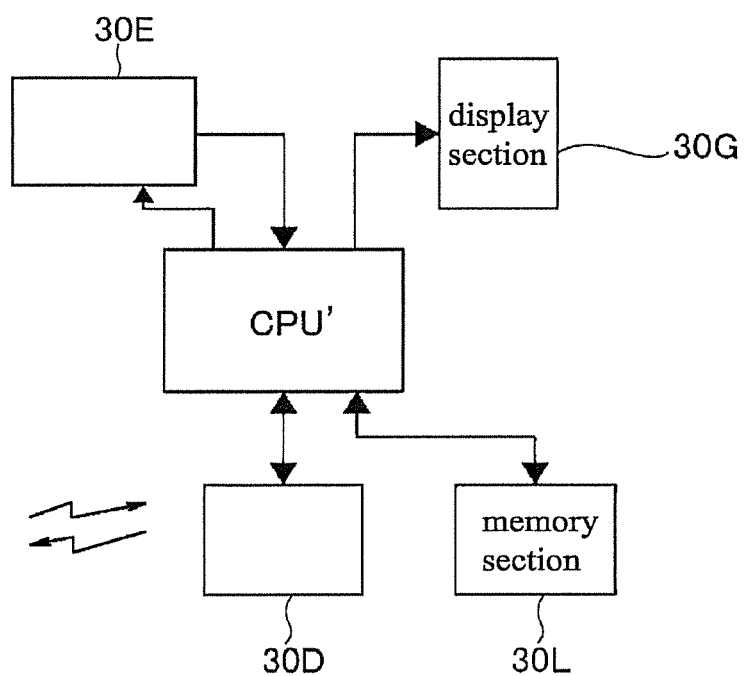
FIG. 6 A block circuit diagram of the portable radio transceiver shown in FIG. 5.

While the portable radio transceiver 30C (hereinafter simply referred to as "controller 30C") is, for example, a multi-function mobile phone (smartphone) as shown in FIG. 5, another tablet terminal or laptop personal computer can be used. A display section 30G, a camera section 30E (imaging optical system), a controlling section CPU', a memory section 30L (memory section of portable side) and a radio transceiver 30D (radio transceiver of portable side) shown in FIG. 6 may be required.

The design data about the pile driving point designed in advance in an office is stored in the memory section 30L, and a guiding map corresponding to the design data can be displayed on the display section 30G.

The controlling section CPU' has the functions of displaying the next pile driving point and the current position of the worker (current position of prism 52) and of preparing the guiding map which guides the worker to the next pile driving point. The controlling section CPU' functions as a difference calculating unit, a prism moving direction calculating unit, a portable device moving direction calculating unit, a gradient calculating unit, an amending unit and a display processing unit. The calculations of preparing the guiding map by using these units will be described later. The controlling section CPU' having the data of the current position of the measuring device 2 and the design data of the respective pile driving points can calculate the horizontally direction rotating angels with respect to the respective pile driving points. The controlling section CPU' has a function of transmitting the rotation permission signal from the radio transceiver 30D toward the measuring device 2 when a rotation permission button of the lens barrel is turned on by touching the display section 30G.

(Measurement Pole)

Figure 7:
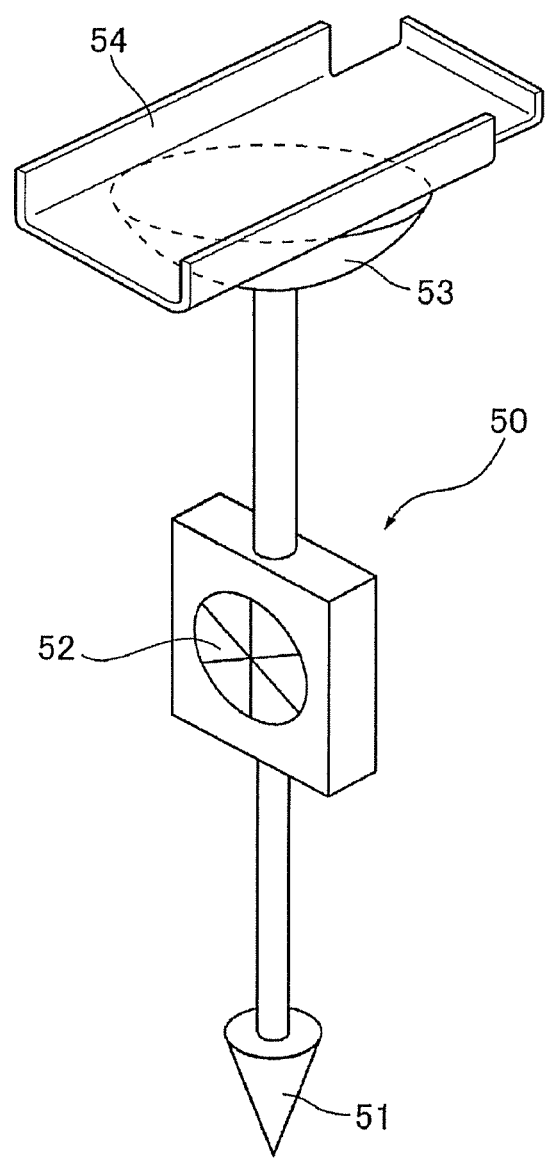
FIG. 7 A perspective view showing an example of a measurement pole used in a measuring system of the embodiment.

While any known measurement pole may be used, a measurement pole 50 shown in FIG. 7 is more preferably used. The measurement pole 50 includes a ferule 51 at its bottom end, is equipped with a retroreflection prism 52 at a position of an appropriate height and has an engaging section 53 which can support the controller 30C at its top end. The top surface of the engaging section 53 is flat, and a holder 54 (fixing section) which can detachably fix the controller 30C is fixed on the top surface. The holder 54 is mounted for holding the front end 30M (refer to FIG. 5) of the controller 30C in a directly facing direction F (refer to FIG. 8) such that the front end 30M is nearly coincident with an incident direction of the prism 52 (light PB3, light pB4). The holder 54 locks the controller 30C in a crosswise direction by means of nails extending horizontally and locks the controller 30C in a rear direction by means of the tail ends of the nails. The controller 30C is detachable at the front ends of the nails. The configuration of the holder 54 shown in FIG. 7 is an example, and any modification can be made based on knowledge of a skilled technician in which the general positioning of the front end 30M of the controller 30C in the directly facing direction F with the measuring device 2 can be determined as long as the controller 30C is detachable.

Figure 8:
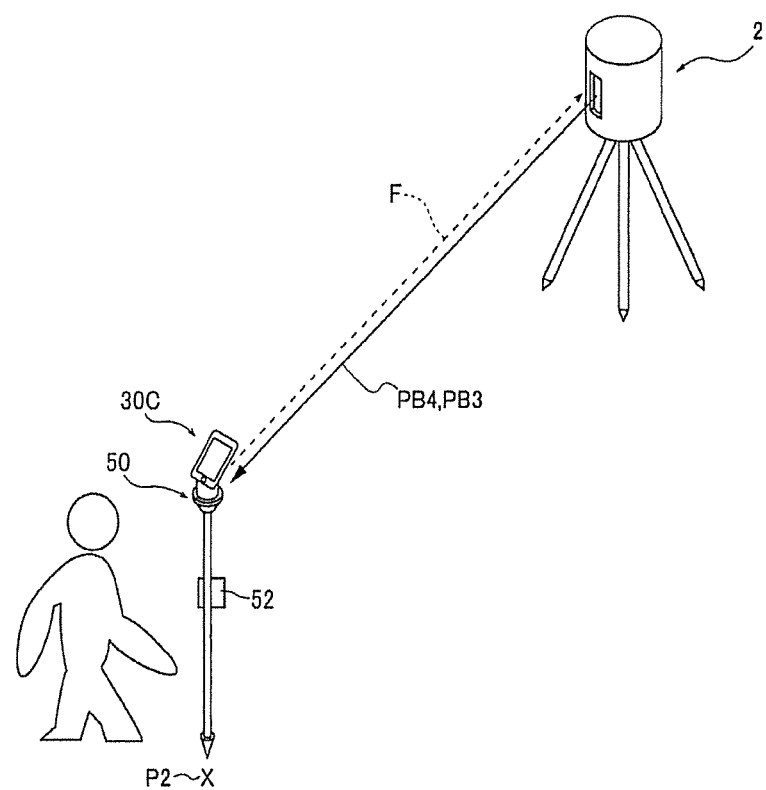
FIG. 8 An illustration showing a way of the measurement using the measuring system of the embodiment.

As described, the measuring system of the embodiment is performed as shown in FIG. 8 by using the above measuring device 2, the controller 30C and the measurement pole 50. The worker moves to the neighborhood of the next pile driving point P2 after the controller 30C is fixed on the axis of the measurement pole 50. Then, the guiding map for guiding the measurement pole 50 to the next pile driving point P2 is displayed on the display section 30G of the controller 30.

(Calculation of Preparing Guiding Map)

Figure 9:
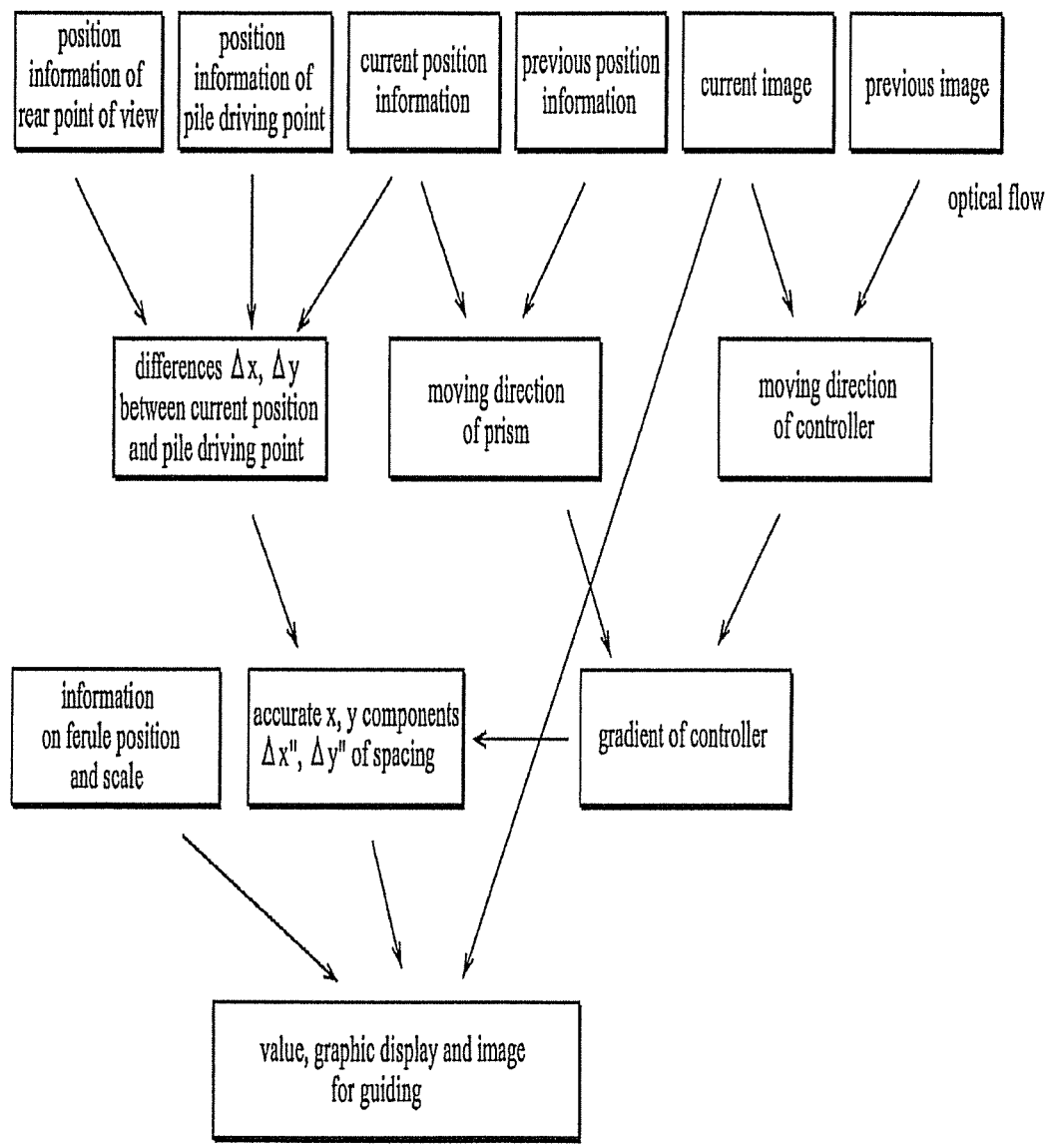
FIG. 9 A flow chart regarding data processing for preparing a guiding map in the measuring system of the embodiment.
Figure 10:
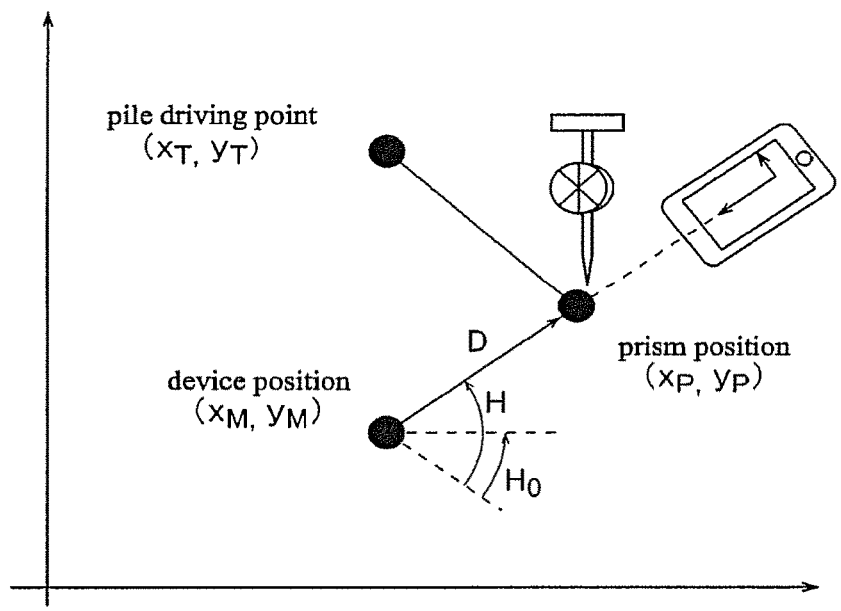
FIG. 10 An illustration showing calculation of a spacing component in accordance with a conventional measuring system.

A flow chart regarding data processing for preparing the guiding map in the measuring system of the embodiment is shown in FIG. 9. All the calculations are conducted in the controlling section CPU' of the controller 30. At first, the controlling section CPU' calculates the differences $\Delta x$, $\Delta y$ between the current position and the pile driving point based on the position information of a rear point of view, the position information of the next pile driving point and the information of the current position. The calculation is similar to that of a conventional calculation, and the calculation will be described by using FIG. 10.

The values of the positions of the measuring device ($X_M$, $Y_M$) and of the next pile driving point P ($X_T$, $Y_T$) are known. A distance D to the prism 52, a zenith angle Z which is a vertically rotating angle by the horizontally rotating axis 7A, a horizontally rotating angle H by the vertically rotating axis 4A, a mechanical zero point (position of 0°) with respect to the base 3, and an offset component $H_O$ are measured in the measuring device 2 and transmitted to the controller 30C.

The controlling section CPU' of the controller 30C calculates the position of the prism 52 ($X_P$, $Y_P$) based on the following equations.

$$X_P = D \sin Z \cos(H - H_O) + X_M \quad (1)$$

$$Y_P = D \sin Z \sin(H - H_O) + Y_M \quad (2)$$

The differences $\Delta x$, $\Delta y$ between the current position ($X_P$, $Y_P$) and the pile driving position ($X_T$, $Y_T$) can be obtained based on the following equations, and these are the guiding information.

$$\Delta x = X_T - X_P \quad (3)$$

$$\Delta y = Y_T - Y_P \quad (4)$$

A conventional guiding map was prepared based on spaced-apart components $\Delta x'$, $\Delta y'$ which are obtained below by using the above $\Delta x$ and $\Delta y$. When the controller is presupposed to directly face the measuring device 2, $\Delta x'$ and $\Delta y'$ are obtained as specified below.

$$\Delta x' = \Delta x \cos(H - H_O + \Pi) - \Delta y \sin(H - H_O + \Pi) \quad (5)$$

$$\Delta y' = \Delta x \sin(H - H_O + \Pi) + \Delta y \cos(H - H_O + \Pi) \quad (6)$$

When an earth magnetic sensor is provided near the controller, and an output value $\varphi$ of the earth magnetic sensor is used, $\Delta x'$ and $\Delta y'$ are obtained as specified below.

$$\Delta x' = \Delta x \cos(\varphi + H - H_O + \Pi) - \Delta y \sin(\varphi + H - H_O + \Pi) \quad (5)'$$

$$\Delta y' = \Delta x \sin(\varphi + H - H_O + \Pi) + \Delta y \cos(\varphi + H - H_O + \Pi) \quad (6)'$$

In the equations (5) and (6) in which the controller is presupposed to directly face the measuring device, when the direction of the controller goes out of the direct facing, an error is produced by the angle out of the direct facing because the calculation is conducted under $\varphi=0$. In the equations (5)' and (6)' in which the earth magnetic sensor is used, a possibility exists that a large error may be produced in the measured $\varphi$ according to conditions such as a magnetic field on a job site. In the embodiment, the guiding map is prepared not by using the equations (5) and (6) and the equations (5)' and (6)' but by using amended spaced-apart components $\Delta x''$, $\Delta y''$ obtained below.

Again, FIG. 9 which is the flow chart regarding data processing is referred to. In the embodiment of the present invention, the controlling section CPU' calculates the moving direction of the prism 52 from the position information received at this time and the position information received at the previous time. Then, the image of the camera section 30E at the site receiving the current position information and the image of the camera section 30E at the site receiving the previous position information are processed in an optical flow manner to calculate the moving direction of the controller 30C. When the front end 30M of the controller 30C is accurately positioned in the directly facing direction F with the measuring device 2, the moving direction of the prism 52 and the moving direction of the controller 30C are coincident with each other. However, when the moving directions are different from each other, the front end 30M of the controller 30C is out of the directly facing direction F with the measuring device 2 (inclined). The operation of directly facing the front end 30M of the controller 30C to the measuring device 2 in a complete manner is practically difficult.

Figure 11:
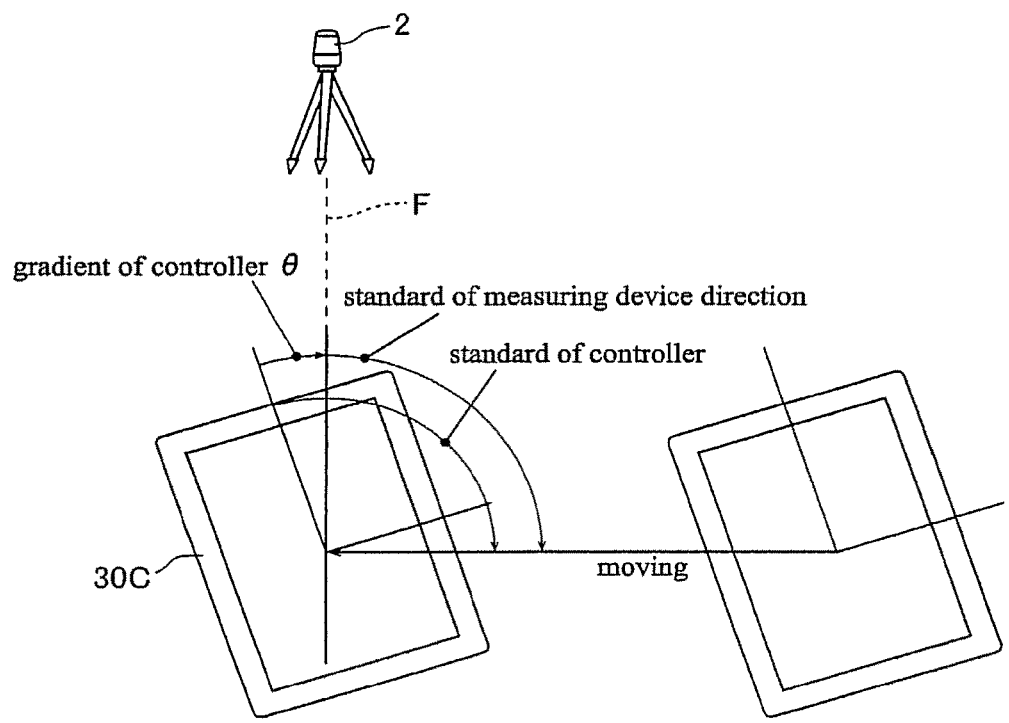
FIG. 11 An illustration showing calculation of a gradient component of the portable radio transceiver.
Figure 12:
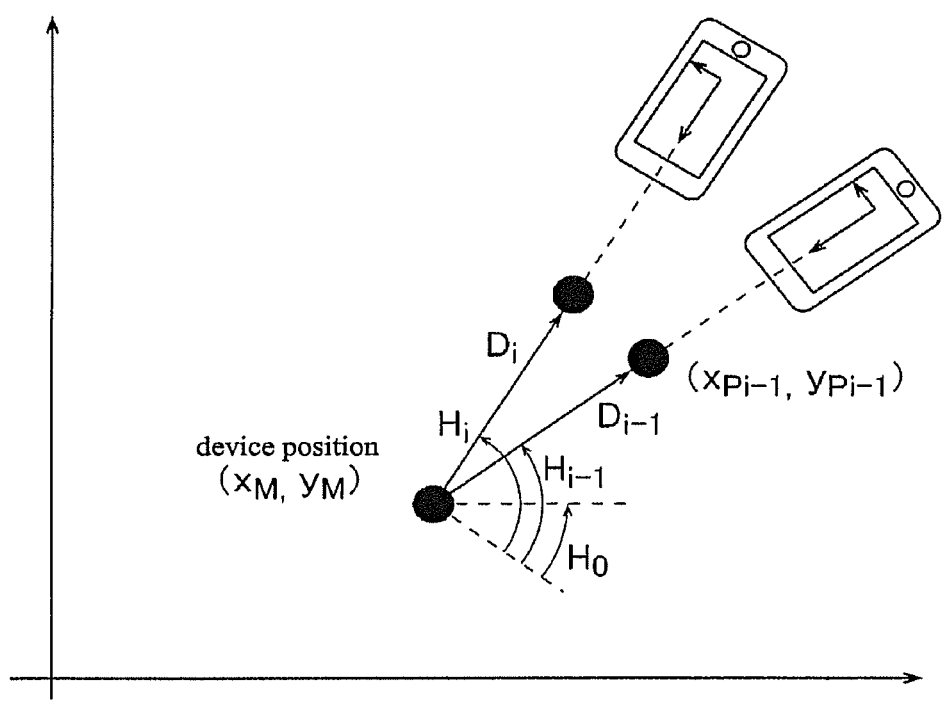
FIG. 12 An illustration showing calculation of the spacing component in the measuring system of the embodiment.

Accordingly, when the moving direction of the prism 52 is different from the moving direction of the controller 30C, the controlling section CPU' calculates the gradient θ (refer to FIG. 11) from the directly facing direction F of the front end 30M of the controller 30C and the measuring device 2. Then, the above differences Δx, Δy are amended by using this gradient component θ, which will be described referring to FIG. 12.

The controller 30C receives the information of the distance $D_i$ to the prism 52, the zenith angle $Z_i$ and the horizontally rotating angle $H_i$ received at this time ("i"th), and the information of the distance $D_{i-1}$ to the prism 52, the zenith angle $Z_{i-1}$ and the horizontally rotating angle $H_{i-1}$ received at the previous time ("i-1"th) from the measuring device 2. The controlling section CPU' obtains the moving direction of the prism 52 from the difference between the "i"th and the "i-1"th by using equations below.

$$\delta X_i = X_i - X_{i-1} \quad (7)$$

$$\delta Y_i = Y_i - Y_{i-1} \quad (8)$$

$$\delta H_i = H_i - H_{i-1} \quad (9)$$

The moving amounts of the controller 30C ($x_{Fi}$, $y_{Fi}$, $H_{Fi}$) are obtained by the optical flow processing. The components of the detection values of the moving amounts ($x_{Fi}$, $y_{Fi}$, $H_{Fi}$) in the horizontal plane are used when the parallel components exist on the camera image, or an acceleration sensor is present in the controller 30C. The rotating amount (gradient θ) of the controller 30C is obtained from equations below by using a coordination system as a standard.

$$\theta_{i-1} = \tan^{-1}(\delta Y_i/\delta X_i) - \tan^{-1}(y_{Fi}/x_{Fi}) \quad (10)$$

$$\theta_i = \theta_{i-1} + H_{Fi} - \delta H_i \quad (11)$$

The amended spaced-apart components Δx", Δy" are calculated, based on equations below, taking the direction of the measuring device 2 as a standard using the guiding information Δx, Δy. The controlling section CPU' displays the guiding map on the display section by using the amended spaced-apart components Δx", Δy".

$$\Delta x'' = \Delta x \cos(\theta_i - H - H_O + \Pi) - \Delta y \sin(\theta_i - H - H_O + \Pi) \quad (12)$$

$$\Delta y'' = \Delta x \sin(\theta_i + H - H_O + \Pi) - \Delta y \cos(\theta_i + H - H_O + \Pi) \quad (13)$$

Figure 13:
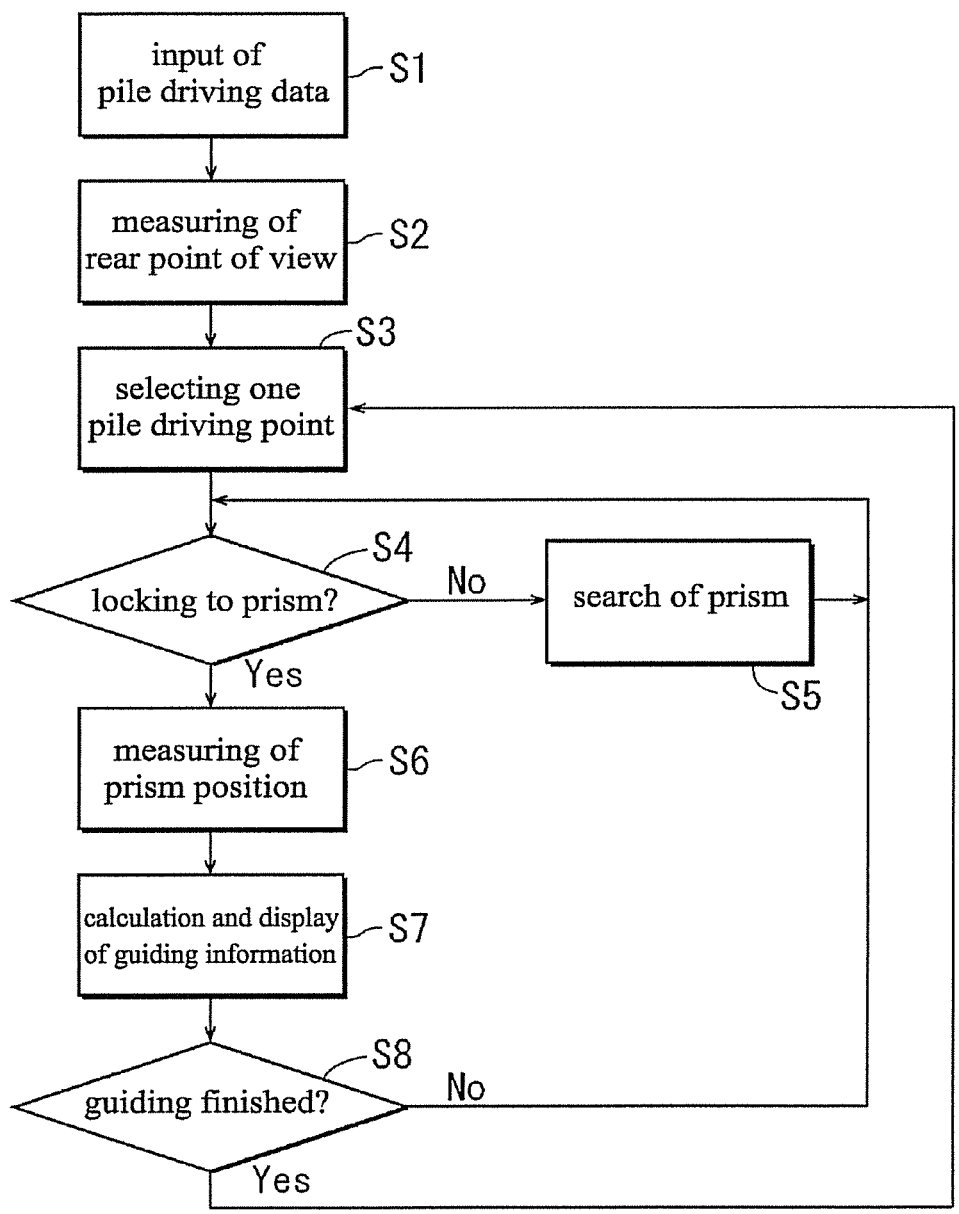
FIG. 13 A flow chart of the measurement in the measuring system of the embodiment.

The above procedures will be further described referring to an operational flow chart of FIG. 13 showing the measurement system of the present embodiment. At first, in a step S1, the data of the pile driving points P1 to P5 is input into the controller 30C. Then, in a step S2, the rear point of view is measured by using the measuring device 2 for calculating the device position of the measuring device 2, and the offset component $H_O$ is settled. Next, in a step S3, the next pile driving point is selected from P1 to P5. Then, whether or not the measuring device 2 locks the prism 52 is judged. When the prism 52 is not locked, the prism 52 is scanned after the shift to a step S5. When the prism 52 is locked, the process is shifted to a step S6. In the step 6, the distance to the prism 52 is measured, and $D_i$, $Z_i$, $H_i$, $D_{i-1}$, $Z_{i-1}$ and $H_{i-1}$ are received from the measuring device 2. Next, in a step S7, the amended spaced-apart components Δx" and Δy" are calculated and the guiding map is displayed on the display section 30G by using the above components. Then, in a step S8, when it is judged that the worker drives a pile at the selected pile driving point, the guiding is completed.

Figure 14:
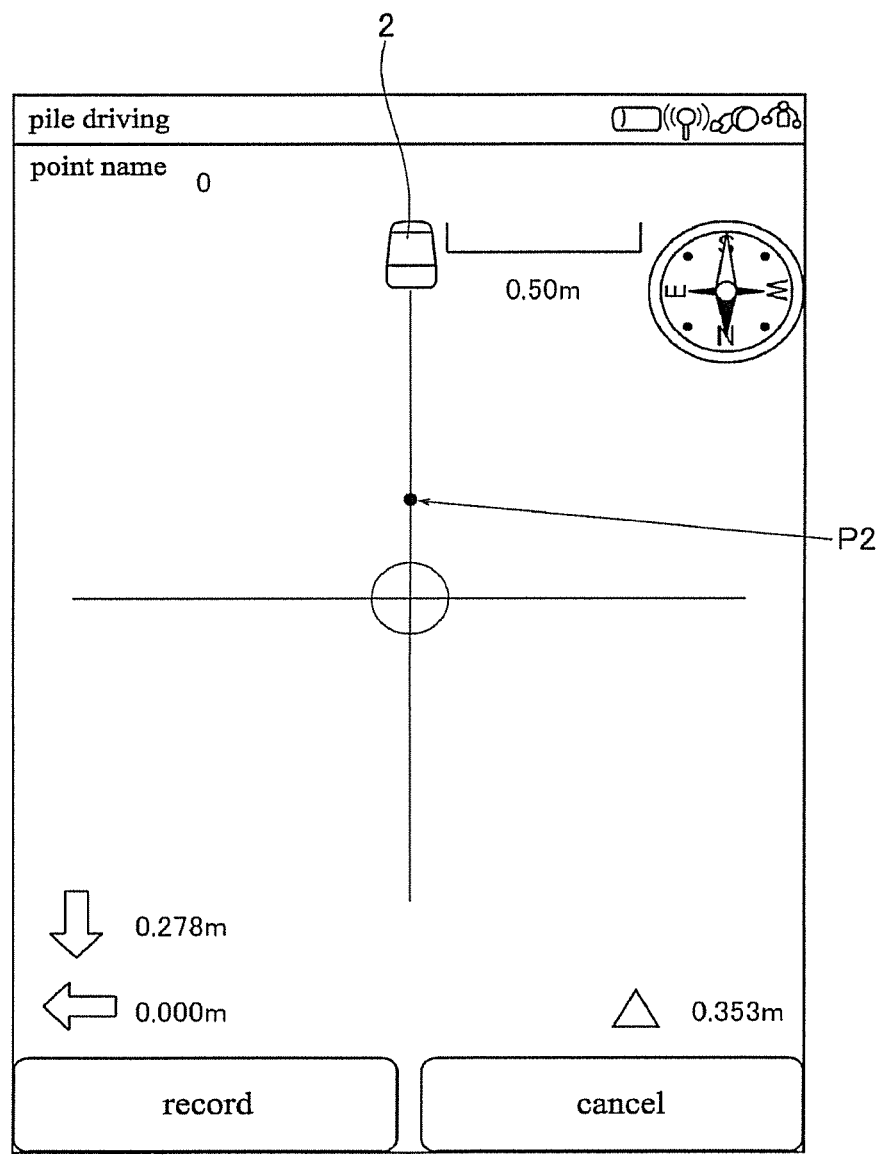
FIG. 14 An example of displaying the guiding map in the measuring system of the embodiment.

FIG. 14 is an exemplary view of graphically displaying the guiding map (step S7) in the measuring system of the embodiment. A center circle in the screen shows the position of the worker (optical axis O1 of camera section 30E), and a black point shows the position of the next pile driving point P2. The pile driving point can be settled by the worker by marking these on the ground as markers. The spaced-apart components Δx" and Δy" from the center circle to the black point in the guiding map may be quantitatively displayed as shown on a lower part of the display section 30G. As shown in FIG. 14, the position information of the measuring device 2 may be also displayed depending on necessity.

Figure 15:
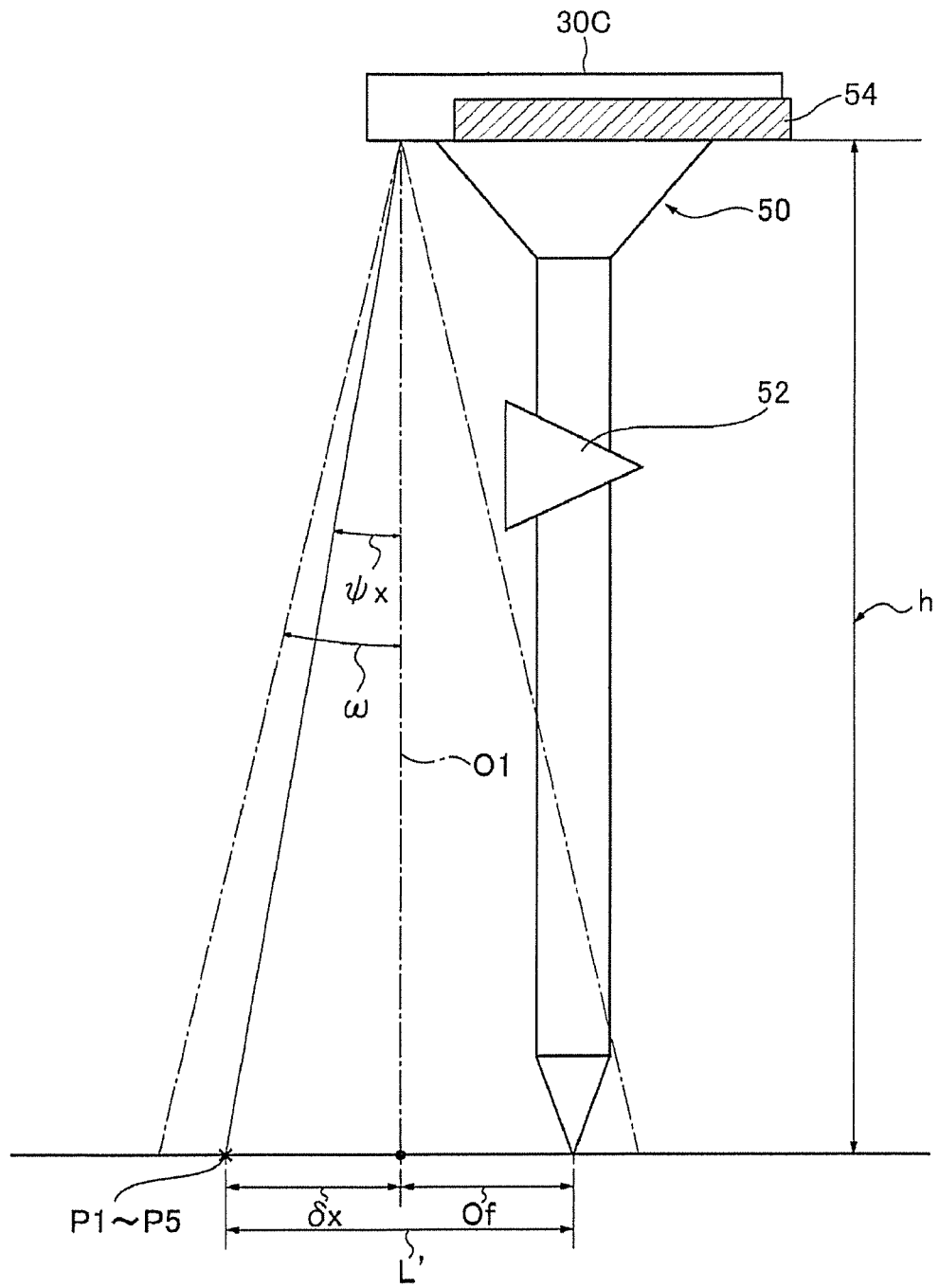
FIG. 15 An illustration showing a relation between a height of the measurement pole and a shooting angle.

Preferably, the guiding map of FIG. 14 may be superimposed on the camera image for performing the instinctive guiding. The calculation steps of this superimposition are similar to those of conventional steps, and the above calculation steps will be described referring to FIG. 15. The position information of the ferule 51 of the measurement pole 50 and the scale information of the camera images are registered in advance. A shooting angle ω in a camera mode shown in FIG. 15 is settled in advance. As shown in FIG. 15, the controller can shoot the neighborhood of the pile driving points P1 to P5 in the camera mode. The positional relation with respect to the Y-direction is similar to the positional relation with respect to the X-direction so that the former is not shown in the drawings. A height from a ground surface to the controller is defined to be "h", a distance from the measurement pole 30B to the optical axis "O1" of the camera section 30E is defined to be "Of", and deviation amounts from the optical axis O1 to the pile driving points P1 to P5 are defined to be $\delta_x$ (or $\delta_y$). If the angles between the optical axis O1 of the camera section 30E and the pile driving points P1 to P5 are defined to be $\Psi_x$ (or $\Psi_y$), a difference distance L' can be calculated by using a known equation, and the distance Of is determined in advance so that the controlling section CPU' can calculate the deviation amount $\delta_x$ (or $\delta_y$) from the difference distance L' and the distance Of by using an equation (15), and can calculate the angle $\Psi_x$ (or $\Psi_y$) by using an equation (14) because the height "h" is known.

$$\delta_x = h \times \tan \Psi_x (\delta_y = h \times \tan \Psi_y) \quad (14)$$

$$L' = \delta_x + Of \quad (15)$$

Accordingly, the controlling section CPU' can calculate the positions of the pile driving positions P1 to P5 to be displayed on the screen of the display section 30G based on the relation between the shooting angle ω and the angle $\Psi_x$ (or $\Psi_y$), and can display the pile driving positions P1 to P5 on the screen on which the ground is actually projected.

As an alternative example, whether or not the guiding information comes into the view of the camera image is judged in the steps S5 and S6 in FIG. 13. Only when the information comes into the view, the camera function may be operated to perform the guiding by using the amended spaced-apart components Δx" and Δy", thereby suppressing the power consumption of the controller 30C.

Another configuration may be used. In this configuration, conventional spaced-apart components Δx' and Δy' are also calculated, and a unit of notifying the worker when the components Δx' and Δy' come into the view of the camera is included. After the notification, the controller 30C is fixed to the holder 54 of the measurement pole, and the guiding is conducted by the amended spaced-apart components Δx" and Δy" on the camera image for suppressing the power consumption of the controller 30C.

DESCRIPTION OF SYMBOLS

2 . . . measuring device
8 . . . lens barrel
9 . . . distance-measuring optical system
10 . . . scanning optical system
35 . . . driving section
36 . . . memory section (memory section of measuring device)
37 . . . radio transceiver (radio transceiver of measuring device)
30C . . . portable radio transceiver
30G . . . display section
30E . . . camera section
CPU' . . . controlling section
30L . . . memory section (memory section of portable side)
30M . . . front end
50 . . . measurement pole
51 . . . ferule
52 . . . prism
54 . . . holder (fixing section)

The invention claimed is:

1. A measuring system comprising:
a measurement pole equipped with a prism;
a measuring device including a lens barrel having a scanning optical system for searching the prism and a distance-measuring optical system for measuring a distance to the prism, a driving section which rotates the lens barrel around a vertical axis in a horizontal direction and around a horizontal axis, an angle-measuring section for measuring a direction of the lens barrel, a memory section of the measuring device which stores, as a measurement data, the distance to the prism obtained by the distance-measuring optical system and the direction of the lens barrel obtained by the angle-measuring section, and a controlling section which controls the driving section, the scanning optical system and the distance-measuring optical system, and controls the driving section such that the lens barrel faces to a next pile driving point to be measured, and a transceiver of a measuring device side transmitting the measurement data stored in the memory section; and
a portable radio transceiver which includes a memory section of a portable side storing a design data of a pile driving point, a display section displaying a guiding map, an imaging optical system, and a radio transceiver of a portable side conducting transmission with the transceiver of the measuring device side,
wherein the measuring device transmits the measurement data stored in the memory section of the portable side to the portable radio transceiver,
the portable radio transceiver is fixed on an axis of the measurement pole, calculates a difference between a current position information of the prism based on the received measurement data and a position information of a next pile driving point based on the design data of the memory section of the portable side, calculates a moving direction of the prism based on the current position information of the prism and a position information obtained at a previous receiving, calculates a moving direction of the portable radio transceiver by calculating an optical flow from a current image of the current position information and from a previous image of the previous position information based on the imaging optical system, calculates a gradient component from a directly facing direction of the portable radio transceiver with respect to the measuring device when the moving direction of the prism is different from the moving direction of the portable radio transceiver, amends the difference by means of the gradient component, and displays, on the display section, a space from the current position of the prism to the next pile driving point by means of the amended gradient component.

2. A measuring system comprising:
a measurement pole equipped with a prism;
a measuring device including a lens barrel having a scanning optical system for searching the prism and a distance-measuring optical system for measuring a distance to the prism, a driving section which rotates the lens barrel around a vertical axis in a horizontal direction and around a horizontal axis, an angle-measuring section for measuring a direction of the lens barrel, a memory section of the measuring device which stores, as a measurement data, the distance to the prism obtained by the distance-measuring optical system and the direction of the lens barrel obtained by the angle-measuring section, and a controlling section which controls the driving section, the scanning optical system and the distance-measuring optical system, and controls the driving section such that the lens barrel faces to a next pile driving point to be measured, and a transceiver of a measuring device side transmitting the measurement data stored in the memory section; and
a portable radio transceiver which includes a memory section of a portable side storing a design data of a pile driving point, a display section displaying a guiding map, an imaging optical system, and a radio transceiver of a portable side conducting transmission with the transceiver of the measuring device side,
wherein the measuring device transmits the measurement data stored in the memory section of the portable side to the portable radio transceiver,
the portable radio transceiver is fixed on an axis of the measurement pole, calculates a difference between a current position information of the prism based on the received measurement data and a position information of a next pile driving point based on the design data of the memory section of the portable side, calculates a moving direction of the prism based on the current position information of the prism and a position information obtained at a previous receiving, calculates a moving direction of the portable radio transceiver by calculating an optical flow from a current image of the current position information and from a previous image of the previous position information based on the imaging optical system, calculates a gradient component from a directly facing direction of the portable radio transceiver with respect to the measuring device when the moving direction of the prism is different from the moving direction of the portable radio transceiver, amends the difference by means of the gradient component, and displays, on the display section, a space from the current position of the prism to the next pile driving point by means of the amended gradient component wherein the portable radio transceiver comprises:

the memory section of the portable side storing the design data;

the display section displaying the guiding map;

the imaging optical system;

the radio transceiver of the portable side conducting the transmission with the transceiver of the measuring device side;

a difference calculating unit calculating the difference between the current position information based on the measurement data and the position information of the pile driving point based on the design data of the memory section of the portable side;

a prism moving direction calculating unit calculating the moving direction of the prism based on the current position information and the previous position information obtained at the previous receiving;

a portable device moving direction calculating unit calculating the moving direction of the prism based on the current position information and the previous position information obtained at the previous receiving;

a portable device moving direction calculating unit calculating the optical flow from the current image of the current position information and from the previous image of the previous position information based on the imaging optical system;

a gradient calculating unit calculating the gradient component from the directly facing direction of the portable radio transceiver with respect to the measuring device when the moving direction of the prism is different from the moving direction of the portable radio transceiver;

an amending unit amending the difference of the difference calculating unit based on the gradient component obtained by the gradient calculating unit; and a display processing unit displaying, on the display section, the space from the current position of the prism to the next pile driving point based on the amended gradient component.

3. A measurement pole used in the measuring system as claimed in claim 1, wherein the measurement pole comprises:

the pole having a ferule at its bottom end;

a retroreflection prism equipped in the pole; and a fixing section detachably fixing the portable radio transceiver on a top end of the pole such that the front end of the portable radio transceiver is nearly coincident with an incident direction of the prism.

4. A measuring system having a portable radio transceiver, wherein the portable radio transceiver comprises:

a memory section of a portable side storing a design data of a pile driving point;

a display section displaying a guiding map;

an imaging optical system;

a radio transceiver of a portable side conducting transmission with a transceiver of a measuring device;

a difference calculating unit calculating a difference between a current position information based on a measurement data of a distance and a direction to a prism and a position information of the pile driving point based on the design data of the memory section of the portable side;

a prism moving direction calculating unit calculating a moving direction of the prism based on the current position information and a previous position information obtained at a previous receiving;

a portable device moving direction calculating unit calculating the moving direction of the prism based on the current position information and the previous position information obtained at the previous receiving;

a portable device moving direction calculating unit calculating an optical flow from a current image of the current position information and from a previous image of the previous position information based on the imaging optical system;

a gradient calculating unit calculating a gradient component from a directly facing direction of the portable radio transceiver with respect to the measuring device when the moving direction of the prism is different from the moving direction of the portable radio transceiver;

an amending unit amending the difference of the difference calculating unit based on the gradient component obtained by the gradient calculating unit; and a display processing unit displaying, on the display section, a space from the current position of the prism to the next pile driving point based on the amended gradient component.

5. A portable radio transceiver used in the measuring system as claimed in claim 1, wherein the portable radio transceiver includes a gradient calculating unit that calculates a gradient component from a directly facing direction of the portable radio transceiver with respect to the measuring device when the moving direction of the prism is different from the moving direction of the portable radio transceiver.

6. A portable radio transceiver used in the measuring system as claimed in claim 5, wherein the directly facing direction of the portable radio transceiver corresponds to a directly facing direction of the prism.

* * * * *